United States Patent

Levine et al.

[15] 3,663,294
[45] May 16, 1972

[54] BATTERY EMPLOYING AN ALKALI METAL POLYSULFIDE HAVING A LOW ALKALI METAL HYDROXIDE CONTENT

[72] Inventors: Charles A. Levine, Concord; George S. Fujioka, Walnut Creek, both of Calif.

[73] Assignee: The Dow Chemical Company, Midland, Mich.

[22] Filed: July 1, 1970

[21] Appl. No.: 51,681

[52] U.S. Cl. ............................................. 136/6, 136/83 R
[51] Int. Cl. ................................................... H01m 35/02
[58] Field of Search ................. 136/6, 153, 146, 148, 83, 86, 136/154; 106/52, 54, 63, 69; 204/295

[56] References Cited

UNITED STATES PATENTS

| | | | |
|---|---|---|---|
| 3,476,602 | 11/1969 | Brown et al. | 136/6 |
| 3,404,035 | 10/1968 | Kummer et al. | 136/6 |
| 3,404,036 | 10/1968 | Kummer et al. | 136/6 |

*Primary Examiner*—Anthony Skapars
*Attorney*—Griswold & Burdick, Jerome L. Jeffers and William R. Norris

[57] ABSTRACT

Disclosed is an improved battery cell having a molten alkali metal anode and a molten alkali metal polysulfide catholyte separated by a silicate glass as an alkali metal ion permeable membrane. The improvement involves the use of an alkali metal polysulfide having a low hydroxide content as the catholyte. Use of such a material substantially increases the membrane life.

4 Claims, No Drawings

BATTERY EMPLOYING AN ALKALI METAL POLYSULFIDE HAVING A LOW ALKALI METAL HYDROXIDE CONTENT

BACKGROUND OF THE INVENTION

Recent battery technology, such as that disclosed in U.S. Pat. No. 3,476,602, teaches the use of a molten alkali metal anode and a molten alkali metal polysulfide catholyte separated by an alkali metal ion permeable membrane. In one embodiment of the battery, the membrane is made of a silicate glass. As the battery discharges, alkali metal ions migrate through the membrane into the alkali metal polysulfide catholyte.

The battery must be operated at a temperature greater than about 300° C. in order to maintain the catholyte in the molten state. A problem develops when contacting silicate glass with an alkali metal polysulfide at these elevated temperatures due to cracking and pitting of the glass. Since the glass membrane is preferably quite thin, any such cracking and pitting will greatly reduce the operating life of the cell.

It is believed that the cracking and pitting of the glass is primarily caused by the presence of alkali metal hydroxide impurities in the polysulfide. Alkali metal polysulfides normally contain significant amounts of alkali metal hydroxide. This is the case since any water present in the alkali metal sulfide from which the polysulfide is prepared will react with the sulfide at elevated temperatures to form the corresponding hydroxide which is highly detrimental to silicate glass at temperatures above about 300° C.

It would be desirable and it is an object of the present invention to provide an improved battery cell of the type described containing an alkali metal polysulfide which is substantially more compatible with silicate glasses than those alkali metal polysulfides used before.

SUMMARY OF THE INVENTION

The present invention is an improvement in a battery having a molten alkali metal anode and a molten alkali metal polysulfide catholyte separated by a silicate glass as an alkali metal ion permeable membrane. The improvement involves the use of an alkali metal polysulfide having a low alkali metal hydroxide content.

DESCRIPTION OF THE PREFERRED EMBODIMENTS

In a preferred embodiment of the invention, the alkali metal polysulfide is a sodium polysulfide. Normally, sodium tetrasulfide is used as the catholyte when the battery is assembled. Since sodium tetrasulfide is the preferred alkali metal polysulfide, the following discussion will be concerned with its use. However, the discussion is intended to apply to the use of other alkali metal polysulfides as well.

Since the hydroxide ion is a major factor causing degradation of the glass membrane in the battery, any reduction in its concentration is beneficial. Reduction of the hydroxide level to below about 0.15 weight per cent of the alkali metal polysulfide is desirable and reduction to below 0.10 weight per cent is preferred. Sodium tetrasulfide having a hydroxide ion content below this level has been shown to be less detrimental to glass by a factor of greater than 2 than is the case where the hydroxide ion content is greater than 0.9 weight per cent.

A problem is presented in preparing sodium tetrasulfide which is free of hydroxide impurity. Anhydrous sodium tetrasulfide is not available commercially and must be prepared by the reaction between sodium sulfide and sulfur. Since anhydrous sodium sulfide is also not available commercially, a composition containing as little water as possible must be prepared and then reacted with sulfur to form the tetrasulfide. Careful drying of the sodium sulfide will remove most of the water hydration; however, no practical method is available for producing commercial quantities of sodium sulfide containing small enough amounts of water to keep the hydroxide content below the level necessary for extended use in the battery. Thus, it is necessary to remove hydroxide ions from the sodium tetrasulfide after its preparation.

One method of removing hydroxide ion from the tetrasulfide is to heat it to at least its melting point but below its decomposition point, whichever is lower, and contact it with particulate aluminum under an inert atmosphere.

In order to accomplish substantially complete removal of the hydroxide impurities, the amount of aluminum added should be about 1 weight per cent of the polysulfide being treated. Quantities of aluminum ranging from 2 to 5 per cent of the material are preferred. Small particles, i.e., those having dimensions of less than 100 mesh on the U.S. standard sieve series are preferred due to their greater surface area. The aluminum particles are usually left in contact with the molten polysulfide for from 15 to 30 minutes to cause effective purification. Longer reaction periods may be employed to remove substantially all of the hydroxide impurities.

The following equations are believed to represent the reaction which takes place between aluminum and sodium hydroxide when they are contacted in a sodium tetrasulfide atmosphere:

a. $Al + 3NaOH \rightarrow NaAlO_2 + Na_2O + 3/2H_2$
b. $Na_2O + Na_2S_4 \rightarrow 1\ 3/4Na_2S + 1/4Na_2SO_4 + 2S$
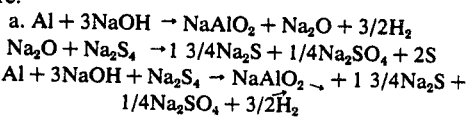

Alternatively, the polysulfide can be purified by contacting it with silica or a silica source material such as glass. The following equations are believed to represent the reaction which takes place between silica and the hydroxide impurity:

(a) $2NaOH + SiO_2 \rightarrow Na_2SiO_3 + H_2O$
(b) $1/2Na_2S_4 + H_2O \rightarrow NaOH + 1/2H_2S + 1\ 1/2S$
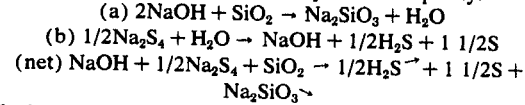

The invention is further illustrated by the following examples:

EXAMPLE I

Sodium tetrasulfide suitable for subsequent purification was prepared as follows:

Commercial reagent grade hydrated sodium monosulfide was dehydrated by boiling out the water with gradual heating to 300° C. The resulting solid material was heated to 300°–400° C. under a blanket of nitrogen. Commercial sulfur (99.8 per cent) was vaporized and passed through an 800° C. zone before being collected in a nitrogen filled receiver. The essentially anhydrous sodium sulfide was mixed with a stoichiometric amount of the sulfur to provide a ratio of sodium to sulfur of 2:4. This composition was digested at 500° C. for 16 hours and filtered to yield the $Na_2S_4$ starting material.

About 25 grams of the $Na_2S_4$ prepared by the above procedure was heated with several small immersed strips of aluminum foil for 66 hours at a temperature range of from 400° to 500° C. The total exposed aluminum surface was between 6 and 8 sq. cm. The purified $Na_2S_4$ (20 gm.) was recovered by filtration of the hot melt through a fritted glass filter.

The purified $Na_2S_4$ was tested by exposing hollow glass fibers (composition $2Na_2O\cdot4SiO_2\cdot B_2O_3$) in an imposed stressed configuration to the polysulfide at a temperature of 300° C. for 112.5 hours. The fibers, which had $100\mu$ O.D. and $50\mu$ I.D. were bent into "U" shapes having a radius of 8 mm. The curved portion was immersed in the test sodium tetrasulfide under a nitrogen atmosphere. Attack on the glass was evidenced by weakening of the fiber as detected in Instron tensile strength measurements. Instron testing of seven replicate test fibers which had been immersed in the purified sodium tetrasulfide revealed failures occurring between 105 and 335 grams load with a median of 200 grams. Unstressed control fibers not exposed to sulfide melt failed at a median load of approximately 250 grams. Identical stressed fibers exposed to sodium tetrasulfide prepared as described herein for 90 hours but not treated with aluminum failed below 100 grams load.

EXAMPLE II

Samples of glass of composition $Na_2O \cdot 2SiO_2 \cdot 1/2B_2O_3$ were placed in glass ampoules with sodium tetrasulfide prepared as described in Example I. Sample A was purified by being heated with 1 weight per cent glass wool having a composition based on weight of $SiO_2$ (80.5%), $B_2O_3$ (12.9%), $Na_2O$ (3.8%), $K_2O$ (0.4%) and $Al_2O_3$ (2.2%), for 20 hours at 350° C. and filtered through a glass frit. Sample B was not purified. The ampoules were sealed and heated to 300° C. At the end of the indicated time the ampoules were opened and the glass examined. The results of these runs are presented in the following table.

| $Na_2S_4$ Sample | Exposure Time | Appearance of Glass |
| --- | --- | --- |
| A | 4 days | No evidence of corrosion |
|   | 42 days | No pitting or surface cracks, some strain cracks |
| B | 63 hours | Surface cracks and beginning of crazed surface |

Additional alkali metal polysulfides which can be purified by the method disclosed herein and subsequently used in the battery cell with greater efficiency are $Li_2S_2$, $Na_2S_3$, $Na_2S_5$, $K_2S_3$, $Rb_2S_2$, $Rb_2S_5$, $Cs_2S_2$, $Cs_2S_3$ and $Cs_2S_6$.

Other silicate glasses subject to attack by alkali metal hydroxides which may be used with greater efficiency in combination with the purified alkali metal polysulfide are $Na_2O \cdot 2 \cdot 4SiO_2 \cdot 0.3B_2O_3$, $Na_2O \cdot 2.8SiO_2 \cdot 0.6B_2O_3$ and $Na_2O \cdot 2.75SiO_2 \cdot 0.6 B_2O_3 \cdot 0.05MgO$.

Due to the difficulty encountered in analyzing alkali metal polysulfide for hydroxide ion content, it may be desirable to conduct emperical tests to determine when the purification reaction has gone to the desired degree of completion. Such tests would involve immersing "U" shaped glass fibers in the molten sulfide for various periods of time and determining the amount of corrosion by tensile strength measurements in the manner set out in Example I.

We claim:

1. In a battery having a molten alkali metal anode and a molten alkali metal polysulfide catholyte separated by a silicate glass as an alkali metal ion permeable membrane, the improvement which comprises employing an alkali metal polysulfide which has been treated to reduce its alkali metal hydroxide content to a concentration of below about 0.10 weight per cent of the alkali metal polysulfide, thereby reducing corrosion of the glass membrane.

2. The improvement as defined in claim 1 wherein the silicate glass has the formula $Na_2O \cdot 2SiO_2 \cdot 0.5B_2O_3$, $Na_2O \cdot 2.4 SiO_2 \cdot 0.3_2O_3$, $Na_2O \cdot 2.8SiO_2 \cdot 0.6B_2O_3$, or $Na_2O \cdot 2.75SiO_2 \cdot 0.6B_2O_3 \cdot 0.05MgO$.

3. The improvement as defined in claim 1 wherein the silicate glass has the formula $2Na_2O \cdot 4SiO_2 \cdot B_2O_3$.

4. The improvement as defined in claim 1 wherein the alkali metal hydroxide level is reduced to a concentration of below about 0.15 weight per cent of the alkali metal polysulfide.

* * * * *